(12) United States Patent
Gavin

(10) Patent No.: US 6,283,533 B1
(45) Date of Patent: Sep. 4, 2001

(54) BOOT COVER APPARATUS

(76) Inventor: Lawrence E. Gavin, 1672 Maple Creek Ct., Rochester, MI (US) 48306

( * ) Notice: Subject to any disclaimer, the term of this patent is extended or adjusted under 35 U.S.C. 154(b) by 0 days.

(21) Appl. No.: 09/710,405

(22) Filed: Nov. 9, 2000

Related U.S. Application Data

(60) Provisional application No. 60/167,728, filed on Nov. 29, 1999.

(51) Int. Cl.[7] .......................................................... B06J 7/20
(52) U.S. Cl. ...................................... 296/136; 296/107.08
(58) Field of Search ................................ 296/136, 107.08

(56) References Cited

U.S. PATENT DOCUMENTS

| | | |
|---|---|---|
| 2,747,928 | 5/1956 | Olivier et al. . |
| 3,172,695 | 3/1965 | Bordinat, Jr. . |
| 4,512,606 * | 4/1985 | Trostle et al. .......................... 296/136 |
| 4,600,233 | 7/1986 | Boydston . |
| 4,669,774 * | 6/1987 | Crain ..................................... 296/136 |
| 4,679,844 * | 7/1987 | Wolford et al. ...................... 296/136 |
| 4,712,828 * | 12/1987 | Albrecht ........................... 296/107.08 |
| 4,783,113 * | 11/1988 | Padlo .................................... 296/136 |
| 4,930,833 * | 6/1990 | Cichoski et al. ..................... 296/136 |
| 4,971,385 * | 11/1990 | Lazarevich ........................... 296/136 |
| 4,998,766 * | 3/1991 | Biermacher et al. ................. 296/136 |
| 5,322,337 * | 6/1994 | Rawling et al. ...................... 296/136 |
| 5,395,152 * | 3/1995 | Skornicka et al. ............... 296/107.08 |
| 5,582,454 * | 12/1996 | Grover ............................. 296/107.08 |
| 5,649,733 * | 7/1997 | Seel et al. ............................. 296/136 |
| 6,120,087 * | 9/2000 | Lake ..................................... 296/136 |

* cited by examiner

*Primary Examiner*—Joseph D. Pape
*Assistant Examiner*—Kiran B. Patel

(57) ABSTRACT

A boot cover apparatus is provided for an extendable top that is contained in a top-reception well in a motor vehicle. The boot cover apparatus includes a flexible cover member which includes a front cover end and a rear cover end. The front cover end is attached to a wall portion of the top-reception well. A first hook or loop connector is attached to the rear cover end, and a second loop or hook connector attached to a portion of the extendable top. The first hook or loop connector is connected to the second loop or hook connector when the extendable top is contracted into the top-reception well. The cover member includes side wings that extend transversely from the cover member. The rear cover end includes a stiffener member onto which the first hook or loop connector is attached. The extendable top includes a top bow, and the second loop or hook connector is attached to the top bow. A back of a seat forms the wall portion of the top-reception well to which the front cover end of the cover member is attached.

5 Claims, 3 Drawing Sheets

BOOT COVER APPARATUS

CROSS-REFERENCE TO RELATED APPLICATION

This application claims priority based upon my copending Provisional Application Serial No. 60/167,728, filed Nov. 29, 1999.

BACKGROUND OF THE INVENTION

1. Field of the Invention

The present invention relates generally to automobiles that have a convertible top, and, more particularly, to covers especially adapted for covering a top-reception well when the convertible top is retracted.

2. Description of the Prior Art

An automobile that has a convertible top employs a top-reception well for storing the convertible top when the convertible top is in a retracted condition. When the convertible top is in the retracted condition, a cover is often used to cover the top-reception well. Throughout the years, a number of innovations have been developed relating to covers for the top-reception wells in automobiles, and the following U.S. patents are representative of some of those innovations: U.S. Pat. Nos. 2,747,928, 3,172,695, 4,600,233, 4,930,833, and 5,322,337. More specifically, U.S. Pat. No. 2,747,928 discloses a cover for a top-reception well which is attached by hinges to a portion of an automobile located behind the top-reception well. When the extendable top is extended, the cover is lifted to allow the extendable top to extend. When the extendable top is extended, the cover is retained in a position wherein the front end of the cover points upward. In such a condition, the cover may be susceptible to being jostled by the wind as the automobile is driven. In this respect, it would be desirable if a cover for a top-reception well were provided that does not point upward when the extendable top is extended.

Each of U.S. Pat. Nos. 3,172,695, 4,930,833, and 5,322,337 discloses a cover for a top-reception well which is removed from the vicinity of the top reception well when the extendable top is extended. Once the cover is removed, a place must be located for its storage. Moreover, a cyclic process of cover removal, storage, and replacement needs to be undertaken when such a removal cover is employed. To avoid the cycle of cover removal, storage, and replacement, it would be desirable if a cover for a top-reception well were provided which is not completely removed from the vicinity of the top-reception well when the extendable top is extended.

U.S. Pat. No. 4,600,233 discloses a cover for a top-reception well which employs a rod which extends across and behind the cover. To avoid the complexities associated with the rod and the support structures for the rod, it would be desirable if a cover for a top-reception well were provided which does not employ a rod located across and behind the cover.

Still other features would be desirable in a boot cover apparatus. For example, when an extendable top is being extended, it would be desirable if the boot cover were automatically lifted from covering the top-reception well. In addition, when the extendable top is extended, it would be desirable if the boot cover were automatically moved from a position in which it covers the top reception well to a position in which it is stored while the extendable top is extended.

Thus, while the foregoing body of prior art indicates it to be well known to use boot covers for covering the top-reception well of an automobile when the extendable top is retracted, the prior art described above does not teach or suggest a boot cover apparatus which has the following combination of desirable features: (1) provides a cover for a top-reception well that does not point upward when the extendable top is extended; (2) is not completely removed from the vicinity of the top-reception well when the extendable top is extended; (3) does not employ a rod located across and behind the cover; (4) provides a boot cover which is automatically lifted from covering the top-reception well when the extendable top is extended; and (5) provides a boot cover which is automatically moved from a position in which it covers the top-reception well to a position in which it is stored when the extendable top is extended. The foregoing desired characteristics are provided by the unique boot cover apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a boot cover apparatus for an extendable top that is contained in a top-reception well in a motor vehicle. The boot cover apparatus includes a flexible cover member which includes a front cover end and a rear cover end. The front cover end is attached to a wall portion of the top-reception well. A first hook or loop connector is attached to the rear cover end, and a second loop or hook connector attached to a portion of the extendable top. The first hook or loop connector is connected to the second loop or hook connector when the extendable top is contracted into the top-reception well.

The cover member includes side wings that extend transversely from the cover member. The rear cover end includes a stiffener member onto which the first hook or loop connector is attached.

The extendable top includes a top bow, and the second loop or hook connector is attached to the top bow. A back of a seat forms the wall portion of the top-reception well to which the front cover end of the cover member is attached.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved boot cover apparatus which has all of the advantages of the prior art and none of the disadvantages.

It is another object of the present invention to provide a new and improved boot cover apparatus which may be easily and efficiently manufactured and marketed.

It is a further object of the present invention to provide a new and improved boot cover apparatus which is of durable and reliable construction.

An even further object of the present invention is to provide a new and improved boot cover apparatus which is susceptible of a low cost of manufacture with regard to both materials and labor, and which accordingly is then susceptible of low prices of sale to the consuming public, thereby making such boot cover apparatus available to the buying public.

Still yet a further object of the present invention is to provide a new and improved boot cover apparatus which provides a cover for a top-reception well that does not point upward when the extendable top is extended.

Still another object of the present invention is to provide a new and improved boot cover apparatus that is not completely removed from the vicinity of the top-reception well when the extendable top is extended.

Yet another object of the present invention is to provide a new and improved boot cover apparatus which does not employ a rod located across and behind the cover.

Even another object of the present invention is to provide a new and improved boot cover apparatus that provides a boot cover which is automatically lifted from covering the top-reception well when the extendable top is extended.

Still a further object of the present invention is to provide a new and improved boot cover apparatus which provides a boot cover which is automatically moved from a position in which it covers the top-reception well to a position in which it is stored when the extendable top is extended.

These together with still other objects of the invention, along with the various features of novelty which characterize the invention, are pointed out with particularity in the claims annexed to and forming a part of this disclosure For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
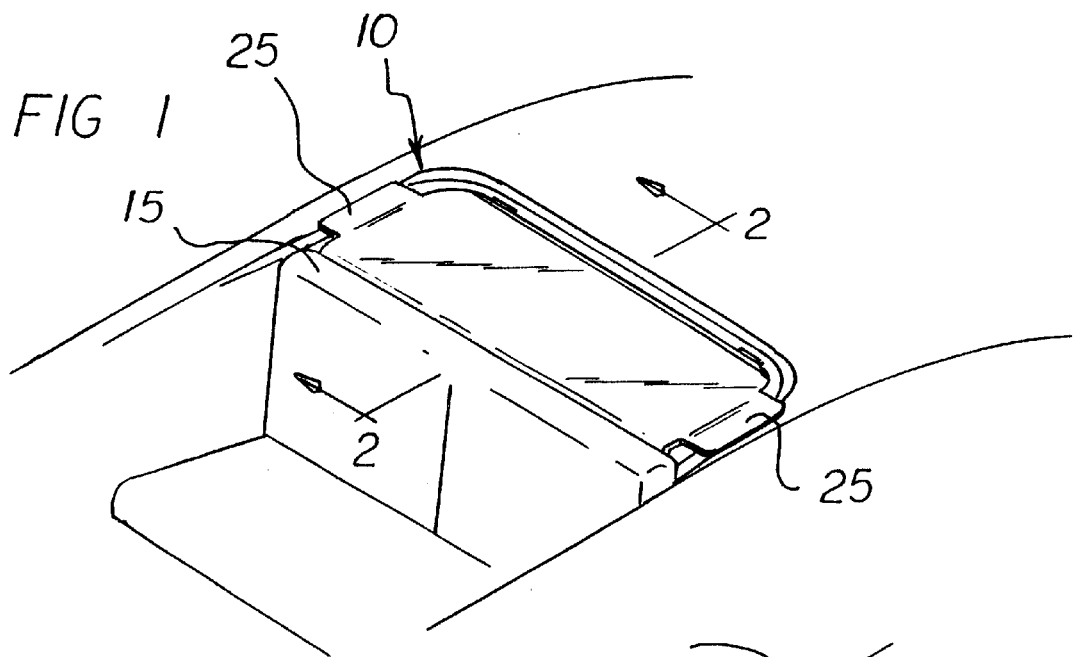
FIG. 1 is a top perspective view showing a preferred embodiment of the boot cover apparatus of the invention in place, covering the well for storing a convertible top in a motor vehicle, wherein the convertible top is a fully contracted condition.

With reference to the drawings, a new and improved boot cover apparatus embodying the principles and concepts of the present invention will be described.

Turning to FIGS. 1–6, there is shown an exemplary embodiment of the boot cover apparatus of the invention generally designated by reference numeral 10. In its preferred form, a boot cover apparatus 10 is provided for an extendable top 11 that is contained in a top-reception well 13 in a motor vehicle. The boot cover apparatus 10 includes a flexible cover member 12 which includes a front cover end 14 and a rear cover end 16. The front cover end 14 is attached to a wall portion of the top-reception well 13. A first hook or loop connector 18 is attached to the rear cover end 16, and a second loop or hook connector 20 attached to a portion of the extendable top 11. The first hook or loop connector 18 is connected to the second loop or hook connector 20 when the extendable top 11 is contracted into the top-reception well 13.

The cover member 12 includes side wings 25 that extend transversely from the cover member 12. The side wings 25 extend over edges of the top-reception well 13 when the extendable top 11 is fully retracted and the boot cover apparatus 10 is in place over the top-reception well 13. The rear cover end 16 includes a stiffener member 17 onto which the first hook or loop connector 18 is attached.

The extendable top 11 includes a top bow 22, and the second loop or hook connector 20 is attached to the top bow 22. A back of a seat 15 forms the wall portion of the top-reception well 13 to which the front cover end 14 of the cover member 12 is attached.

Figure 2:
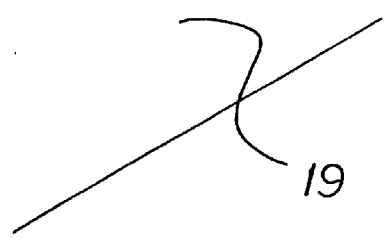
FIG. 2 is an enlarged cross-sectional view of the embodiment of the boot cover apparatus shown in FIG. 1 taken along line 2—2 of FIG. 1, wherein the convertible top is in a fully contracted condition.
Figure 2:
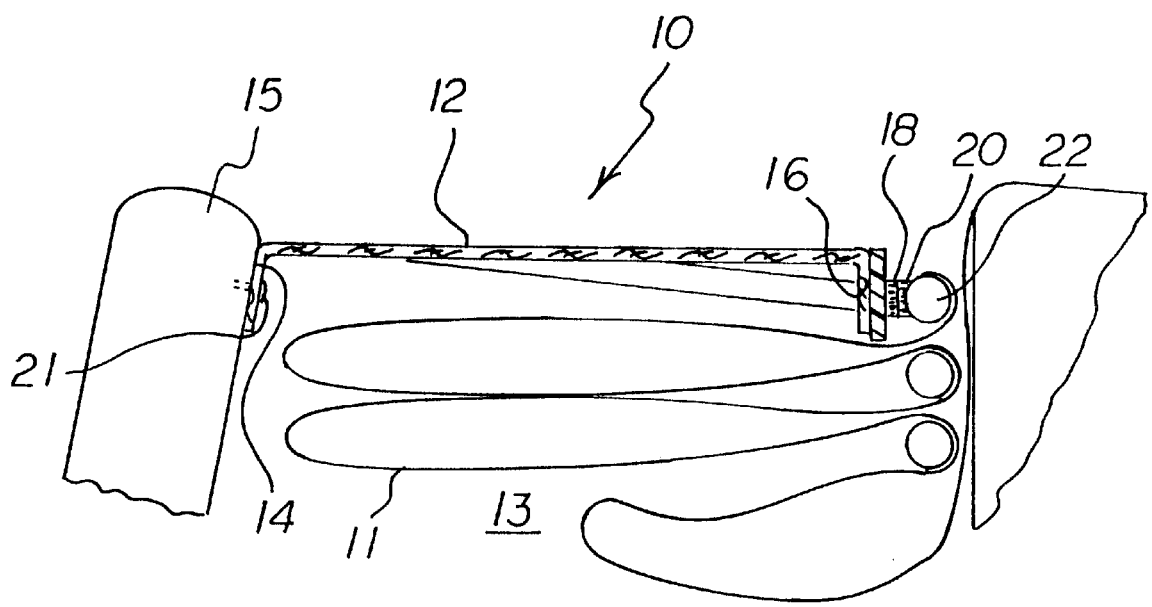

The boot cover apparatus 10 of the invention is used in the following manner. First, the front cover end 14 is attached to the rear side of the back of a seat 15 of a motor vehicle 19. Screws or bolts 21 can be used to attach the front cover end 14 to the back of the back of a seat 15. When the extendable top 11 is in a fully retracted condition, as shown in FIGS. 1 and 2, the cover member 12 is in a substantially horizontal orientation and substantially covers the top-reception well 13 in which the fully retracted extendable top 11 is stored. In this condition, the first hook or loop connector 18 of the cover member 12 is connected to the complementary second loop or hook connector 20 which is attached to the first top bow 22.

Figure 3:
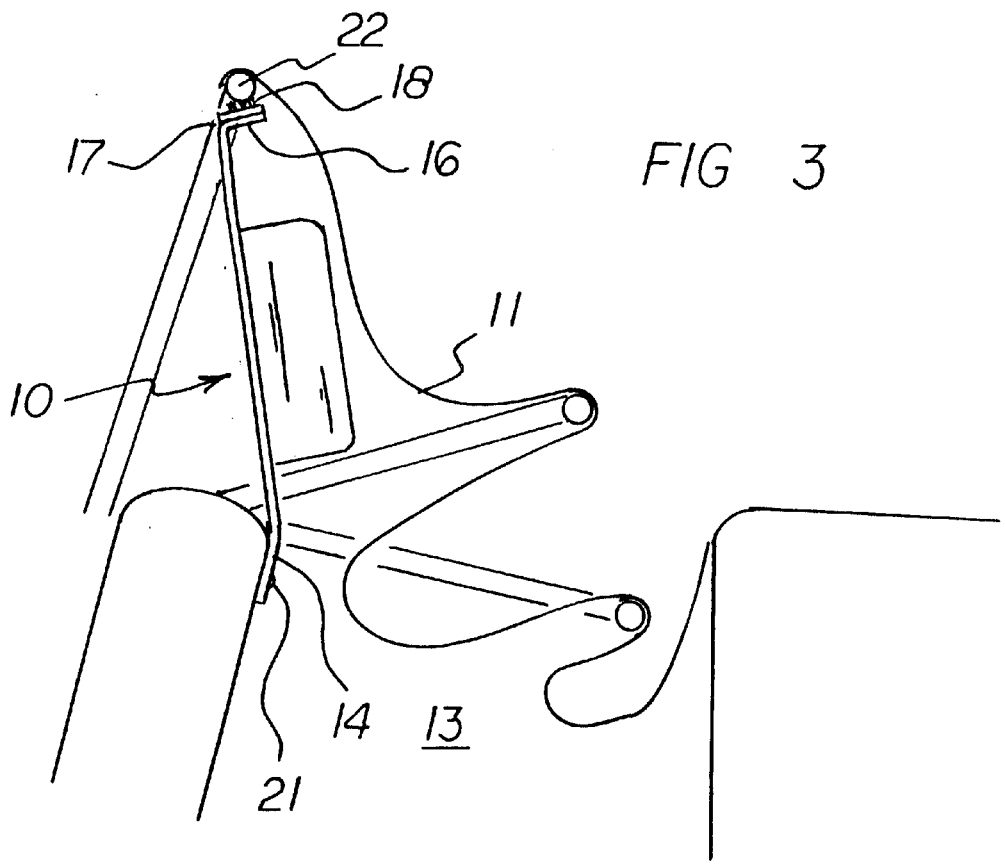
FIG. 3 is a side view of the embodiment of the boot cover apparatus of FIG. 2 wherein the convertible top is in a partially extended condition.
Figure 4:
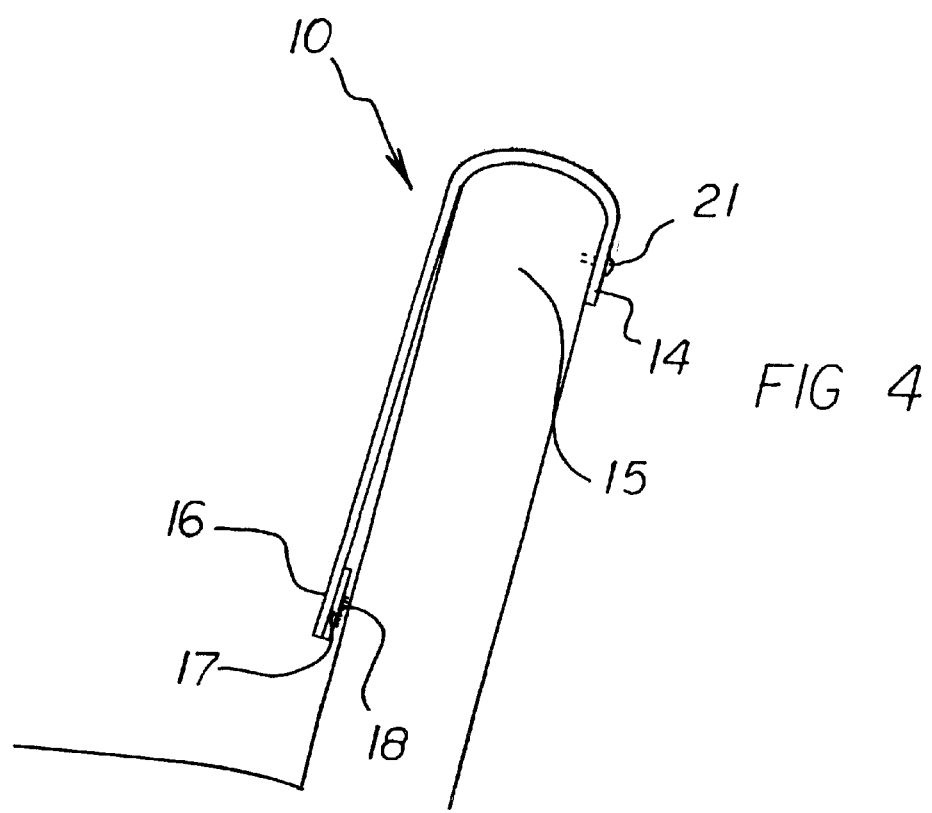
FIG. 4 is a side view of the embodiment of the invention shown in FIGS. 1–3, wherein the leading edge of the boot cover apparatus has detached from the convertible top which has been fully extended (not shown).
Figure 5:
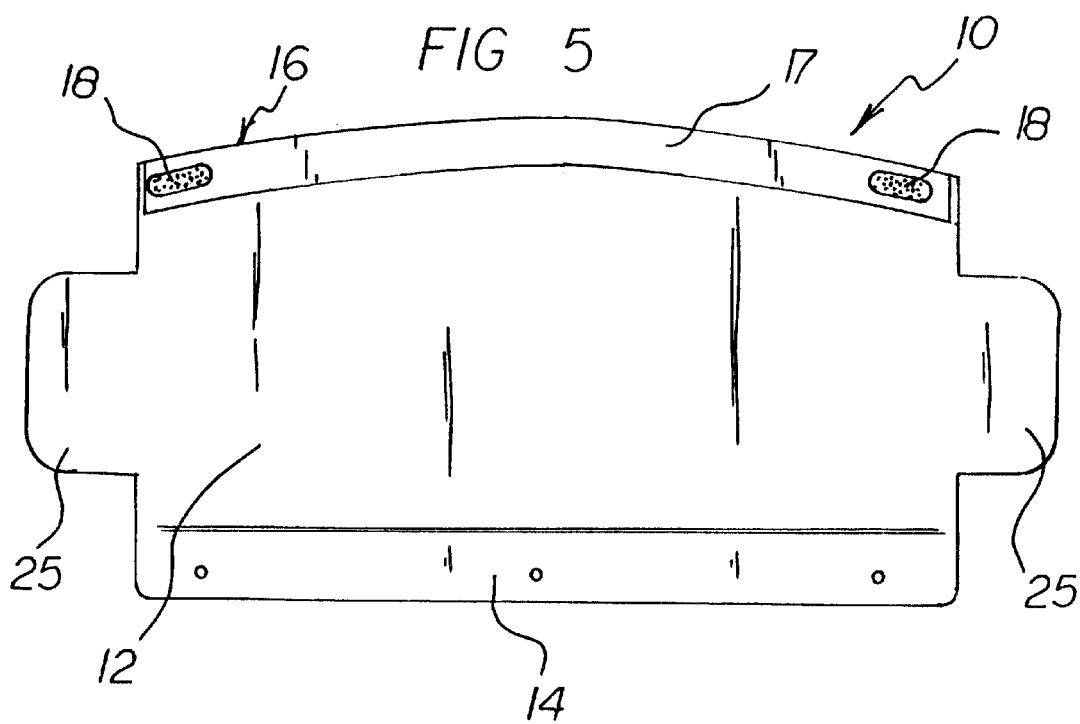
FIG. 5 is a top view of the boot cover apparatus of the invention removed from the motor vehicle.
Figure 6:
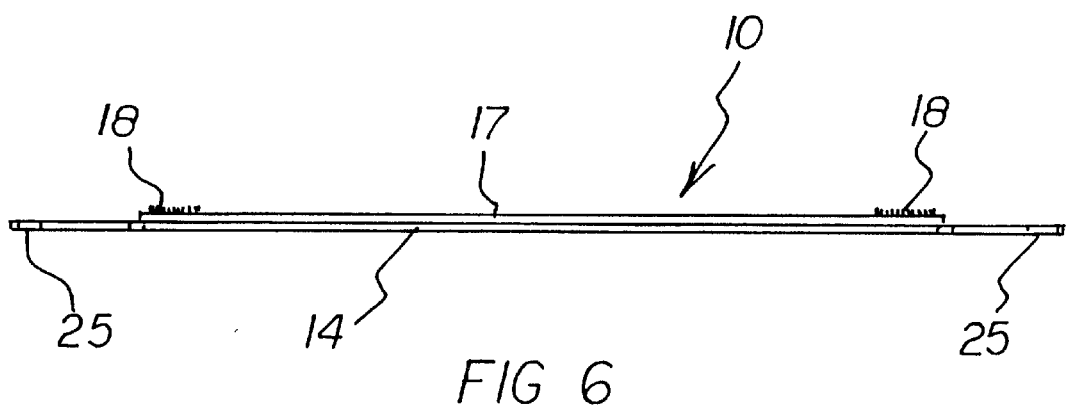
FIG. 6 is an edge view of the embodiment of the invention shown in FIG. 5.

As the extendable top 11 is extended, as shown in FIG. 3, the first top bow 22 lifts the cover member 12 so that the cover member 12 is in a nearly vertical orientation. As the extendable top 11 is extended farther, the first top bow 22 moves toward the front of the motor vehicle so that the rear cover end 16 is located over and in front of a seat 15. As the extendable top 11 is extended even farther along its path of extension, the first top bow 22 automatically pulls away from the boot cover apparatus 10. More specifically, the second loop or hook connector 20 is pulled away from the first hook or loop connector 18. When this is done, the front cover end 14 falls away from the first top bow 22, and the cover member 12 becomes draped over the seat 15 as shown in FIG. 4. The cover member 12 can remain in this position when the extendable top 11 is fully extended, or, if desired, the cover member 12 can be flipped back so that the front cover end 14 extends down into the top-reception well 13 with the extendable top 11 fully extended.

The boot cover apparatus 10 of the invention can replace conventional boot covers which are filly removable and replaceable. The inconvenience of conventional boot covers is overcome by the boot cover apparatus 10 of the invention which includes a front cover end 14 attached to the back of a seat 15 whether the boot cover apparatus 10 is in use or not.

Preferably, the cover member 12 is made from a piece of upholstery material that matches the upholstery of the seat 15. The cover member 12 has a sufficient length and width to substantially cover the top-reception well 13 when the extendable top 11 is fully retracted.

The components of the boot cover apparatus of the invention can be made from inexpensive and durable cloth and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved boot cover apparatus that is low in cost, relatively simple in design and operation, and which advantageously provides a cover for a top-reception well that does not point upward when the extendable top is extended. With the invention, a boot cover apparatus is provided which is not completely removed from the vicinity of the top-reception well when the extendable top is extended. With the invention, a boot cover apparatus is provided which does not employ a rod located across and behind the cover. With the invention, a boot cover apparatus provides a boot cover which is automatically lifted from covering the top-reception well when the extendable top is extended. With the invention, a boot cover apparatus provides a boot cover which is automatically moved from a position in which it covers the top-reception well to a position in which it is stored when the extendable top is extended.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A boot cover apparatus for an extendable top contained in a top-reception well, comprising:

a flexible cover member which includes a front cover end and a rear cover end, wherein said front cover end is attached to a wall portion of the top-reception well, a first hook or loop connector attached to said rear cover end, and a second loop or hook connector attached to a portion of the extendable top, wherein said first hook or loop connector is connected to said second loop or hook connector when the extendable top is contracted into the top-reception well, wherein said first hook or loop connector is automatically disconnected from said second loop or hook connector when the extendable top is extended out from the top-reception well, and wherein said front cover end remains attached to the wall portion of the top-reception well when the extendable top is extended out from the top-reception well.

2. The apparatus of claim 1 wherein said cover member includes side wings that extend transversely from said cover member.

3. The apparatus of claim 1 wherein said rear cover end includes a stiffener member onto which said first hook or loop connector is attached.

4. The apparatus of claim 1 wherein:

the extendable top includes a top bow, and said second loop or hook connector is attached to the top bow.

5. The apparatus of claim 1 wherein a back of a seat forms the wall portion of the top-reception well to which said front cover end of said cover member is attached.

* * * * *